United States Patent
Sieber et al.

(10) Patent No.: US 11,982,742 B2
(45) Date of Patent: May 14, 2024

(54) NON-LINEAR RECEPTION FILTER FOR AN OBJECT RECOGNITION SENSOR FOR VEHICLES, IN PARTICULAR, ULTRASONIC SENSOR

(71) Applicant: Robert Bosch GmbH, Stuttgart (DE)

(72) Inventors: Udo Sieber, Bietigheim (DE); Ulrich Bauer, Markgroeningen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 257 days.

(21) Appl. No.: 17/278,508

(22) PCT Filed: Nov. 6, 2019

(86) PCT No.: PCT/EP2019/080355
§ 371 (c)(1),
(2) Date: Mar. 22, 2021

(87) PCT Pub. No.: WO2020/126195
PCT Pub. Date: Jun. 25, 2020

(65) Prior Publication Data
US 2022/0035030 A1    Feb. 3, 2022

(30) Foreign Application Priority Data
Dec. 19, 2018  (DE) .......................... 102018222320.3

(51) Int. Cl.
*G01S 15/931* (2020.01)
*G01S 7/292* (2006.01)
*G01S 7/521* (2006.01)

(52) U.S. Cl.
CPC .......... *G01S 15/931* (2013.01); *G01S 7/2926* (2013.01); *G01S 7/521* (2013.01)

(58) Field of Classification Search
CPC ...... G01S 15/931; G01S 7/521; G01S 7/2926; G01S 7/527; G01S 2013/9324
See application file for complete search history.

(56) References Cited

U.S. PATENT DOCUMENTS 10,088,567 B2 * 10/2018 Lee ........................ G01S 15/931
2017/0176188 A1    6/2017 Georgy et al.
(Continued)

FOREIGN PATENT DOCUMENTS

| CN | 103534603 A | 1/2014 |
| CN | 104813379 A | 7/2015 |

(Continued)

OTHER PUBLICATIONS

International Search Report for PCT/EP2019/080355, dated Jan. 29, 2020.

(Continued)

*Primary Examiner* — John A Tweel, Jr.
(74) *Attorney, Agent, or Firm* — NORTON ROSE FULBRIGHT US LLP; Gerard A. Messina

(57) ABSTRACT

An object recognition device for vehicles, including a sensor, a filter device and an analysis device. Signals from an object are detectable by the sensor. The detected signals are filterable by the filter device and then feedable to the analysis device. The analysis device is configured to recognize the object by analyzing the filtered signals. The filter device includes an averaging unit, which averages the profile of the amplitudes of the detected signals, and a non-linear filter unit, which is provided based on a linear low-pass filter with a variable time constant and filters the detected signals. A value profile corresponding to the difference between the averaged amplitude profile and the filtered signals is feedable to the analysis device for analyzing and recognizing the object. The variable time constant is establishable based on the difference between the filtered (Continued)

signals and the detected signals and based on the averaged amplitude profile.

12 Claims, 3 Drawing Sheets

(56) References Cited

U.S. PATENT DOCUMENTS

2020/0363500 A1* 11/2020 Lau .................. G01S 13/931
2020/0363501 A1* 11/2020 Lau .................. G01S 7/497

FOREIGN PATENT DOCUMENTS

| CN | 105474039 A | 4/2016 |
|---|---|---|
| CN | 106164700 A | 11/2016 |
| CN | 107291998 A | 10/2017 |
| CN | 108603926 A | 9/2018 |
| CN | 108917797 A | 11/2018 |
| DE | 3713758 A1 | 11/1988 |
| DE | 19716680 C1 | 4/1998 |
| DE | 102008041894 A1 | 3/2010 |
| DE | 102011102574 A1 | 11/2012 |
| DE | 102013200434 A1 | 7/2014 |
| EP | 2322952 A2 | 5/2011 |
| EP | 2530488 A1 | 12/2012 |
| EP | 2762919 A2 | 8/2014 |
| JP | S58152546 A | 9/1983 |
| JP | H01280273 A | 11/1989 |
| JP | 2008151537 A | 7/2008 |
| JP | 2014232067 A | 12/2014 |
| WO | 2015197231 A1 | 12/2015 |
| WO | 2017069162 A1 | 4/2017 |

OTHER PUBLICATIONS

Wei-Qi, et al.: "Performance comparison of several ultrasoundNDE de-noising techniques," Technical Acoustics (2007), Abstract only.

\* cited by examiner

NON-LINEAR RECEPTION FILTER FOR AN OBJECT RECOGNITION SENSOR FOR VEHICLES, IN PARTICULAR, ULTRASONIC SENSOR

FIELD

The present invention relates to an object recognition device for vehicles. The present invention also relates to a method for recognizing an object for vehicles.

BACKGROUND INFORMATION

Certain driver assistance functions based on ultrasonic sensors are conventional. An important function of an ultrasonic sensor is the detection of objects. In one typical application scenario, an ultrasonic signal is initially emitted by the ultrasonic sensor. After a short time, a signal reflected by an object, i.e., an echo, is received back by the ultrasonic sensor. In the process, it is evaluated whether the received signal exceeds a predefined threshold curve, which indicates an object located in the surroundings of the relevant vehicle.

Such an ultrasonic sensor may be made up essentially of an electro-acoustic sound converter as well as an activation and evaluation circuit. During operation, the sound converter is prompted via its circuitry with a defined frequency-modulated signal (frequency sweep) to produce oscillations. The reflected ultrasonic signal is received back at the converter and converted from analog data to digital data. A downsampling method and a filtering method may also take place with the aid of a matched filter. The filtered digital signal is then used as an input signal for calculating an adaptive threshold, which is used as a basis for an echo detection.

An adaptive threshold is essentially the average of the received signal over a certain window length and the multiplication by a sensitivity parameter. The calculation of the adaptive threshold may take place based on the received signal with the aid of a constant false alarm rate algorithm (CFAR) or of similar algorithms.

The adaptive threshold of ultrasonic sensors may, however, result in sensitivity losses of high amplitude values in the vicinity of strongly reflecting objects. As an example, reference is made to the scenario illustrated in FIG. 1.

In that scenario, the difficulty is detecting with high sensitivity bushes 4, which are located approximately 30 to 40 cm behind post 6, even though the bush is an entity that includes numerous sound reflections. At long distance, these are difficult to distinguish from noises.

European Patent Application No. EP 2 322 952 A3 describes a method for detecting an object with the aid of a sensor of a driver assistance device operating according to the echo propagation time principle. A transmit signal having a predefined amplitude is transmitted by the sensor at a transmission point in time. A received signal is received by the sensor at a later receiving point in time. The received signal is evaluated with a view to recognizing an exceedance of a predefined lower threshold. The received signal is evaluated in terms of whether its amplitude is below an upper threshold as a function of the amplitude of the transmit signal, the received signal then being recognized as the transmit signal reflected by the object for detecting the object when the amplitude of the received signal is between the two thresholds.

SUMMARY

The present invention provides an object recognition device for vehicles, and a method for recognizing an object for vehicles.

Preferred refinements and example embodiments of the present invention are described herein.

An example embodiment of the present invention provides an object recognition device for vehicles, which has an adaptive non-linear filter structure. The non-linear filter according to the example embodiment of the present invention results from the use of a variable time constant in a standard linear low-pass filter. According to the present invention, when determining the variable time constant, the difference between the filtered signals and the detected signals as well as the average amplitude profile of the detected signals are taken into account.

With the object recognition device according to the present invention, different objects, which are located in the surroundings of the vehicle and are situated very close to one another, are to be distinguished from each another for a vehicle.

In addition, an increased sensitivity for signals is implemented, which are reflected by a multi-reflecting object such as, for example, the bush depicted in FIG. 1. Thus, according to the present invention, an improved separation is possible between the useful signal, i.e., the signal reflected by a multi-reflecting object, and the noise signal.

Since according to the present invention an improved sharpness of separation is achieved between the useful signal and the noise signal, more cost-efficient sensors may be used for the object recognition without having to employ relatively expensive sensor components for increasing the sensitivity of the sensors.

Despite reasonably sufficient elimination of the noises, the signal delay of the amplitude values for a recognized useful signal is also minimal according to the present invention. The position accuracy of the recognized objects is therefore considerably high.

The present invention also provides a method for recognizing an object for vehicles including the above-described advantages.

In one preferred specific embodiment of the object recognition device according to the present invention, it is provided that the variable time constant is establishable with the squared deviation between the filtered signals and the detected signals, with a predefined minimum time constant, a predefined maximum time constant, a predefined tolerance width and a grade, which determines the transition between the predefined minimum time constant and the predefined maximum time constant.

According to the present invention, the variable time constant is calculated or established according to the following equation and is represented by a non-linear characteristic curve:

$$T_{Filter} = \frac{1 + s \cdot (e^2 - a)}{\frac{1}{T_{min}} \cdot (1 + s \cdot (e^2 - a)) - \frac{1}{T_{min}} + \frac{1}{T_{max}}}$$

Accordingly, symbol $T_{Filter}$ stands for the variable time constant to be established. Parameters s, a, $T_{min}$, $T_{max}$ and $e^2$ in the equation each stand for the following:

s: grade of the non-linear characteristic curve, which grade determines the transition between $T_{max}$ and $T_{min}$, a: tolerance width or tolerance range of the non-linear characteristic curve, $T_{min}$: minimum time constant of the non-linear characteristic curve, $T_{max}$: maximum time constant of the non-linear characteristic curve, and $e^2$: squared deviation between the filtered signals and the detected signals.

In one further preferred specific embodiment, it is provided that the grade corresponds proportionally to the inverse of the square of the amplitude value provided in the averaged amplitude profile. As a result, the grade may respond to the averaged amplitude profile during the propagation time and the non-linear characteristic curve may be adaptively carried along.

This means that the smaller the averaged amplitude value turns out to be, the more sensitively the non-linear filter according to the present invention is able to respond to amplitude changes. The grade in this specific embodiment may be designated as symbol $s_{adapt}$ and may be calculated according to the following equation:

$$s_{adapt} = \frac{k}{A_{filt}^2}$$

The symbol $A_{filt}^2$ and k stand for the square of the averaged amplitude value and for a proportionality factor, respectively.

In one further preferred specific embodiment, it is provided that the variable time constant is establishable as the predefined maximum time constant if the squared deviation between the filtered signals and the detected signals falls within a predefined tolerance width. The time constant is thus selected to be preferably large in order to achieve a greatest possible filter effect.

In one further preferred specific embodiment of the present invention, it is provided that the averaging unit is a low-pass filter, a unit for implementing the method of the floating average or a unit for implementing the method of the adaptive threshold. Other alternative units, which are able to generate a value proportional to the averaged amplitude profile, may also be used.

In one further preferred specific embodiment of the present invention, it is provided that the filter unit includes a calculation component, which is configured to calculate the variable time constant, that the filter unit includes a return element, which is configured to return the filtered signals with a time delay to the calculation component for establishing the variable time constant, and that the filter unit includes a transmission element, which is configured to transmit the averaged amplitude profile to the calculation component for establishing the variable time constant.

Thus, the non-linear filter according to the present invention allows signals including high dynamics and high amplitudes to pass virtually unfiltered, whereas signals including lower dynamics and lower amplitudes are more thoroughly filtered. An adaptive adaptation of the non-linear characteristic curve to the averaged amplitude profile is also possible.

In one further preferred specific embodiment of the present invention, it is provided that the signals from the object, which is 0.1 m to 20 m away, in particular, 1 m to 6 m away from the sensor, are detectable with the sensor.

In one further preferred specific embodiment of the present invention, it is provided that optical signals are detectable with a further sensor for determining the type and condition of the object. With the aid of a data fusion with ultrasonic signals, it is simultaneously possible to recognize the exact distance of the objects in the surroundings of a vehicle, the type as well as the condition of the objects.

In one preferred specific embodiment of the method according to the present invention, it is provided that the value profile is processed in accordance with the difference between the averaged amplitude profile and the filtered signals in such a way that the negative difference values are disregarded. Thus, after the processing, only the positive differences in the value profile relevant for recognizing the object are depicted.

BRIEF DESCRIPTION OF THE DRAWINGS

The present invention is explained in greater detail with reference to the exemplary embodiments schematically indicated in the figures.

DETAILED DESCRIPTION OF EXAMPLE EMBODIMENTS

Figure 1:
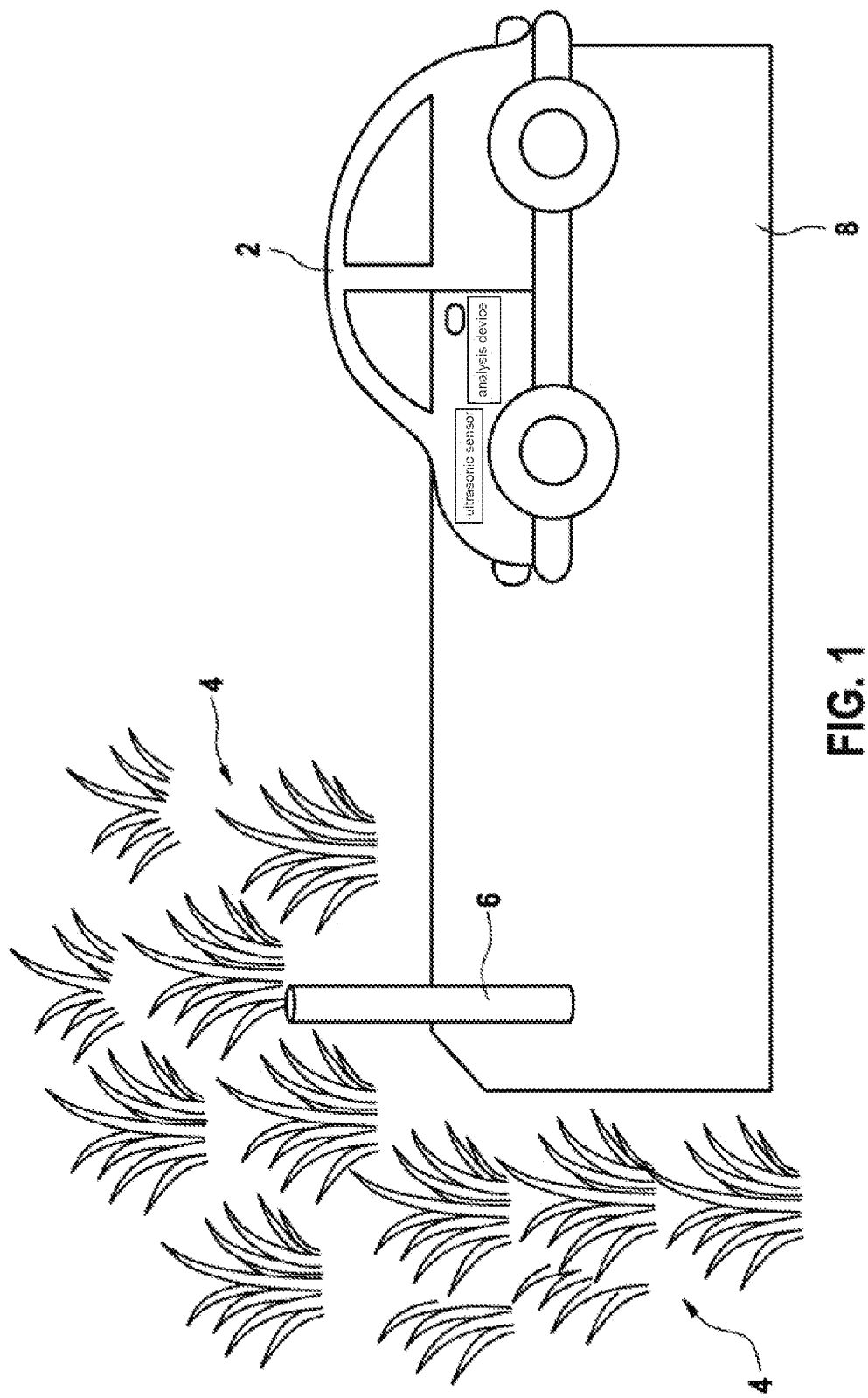
FIG. 1 schematically shows a representation of one application scenario of the object recognition device according to the present invention and/or of the method according to the present invention.

In the figures, identical reference numerals denote identical or functionally identical elements.

FIG. 1 is a schematic representation of one application scenario of the object recognition device according to the present invention and/or of the method according to the present invention.

A vehicle 2 enters a parking facility 8 for the purpose of parking. Approximately 3 m in front of vehicle 2 is a post 6 and located approximately 40 cm behind post 6 are bushes 4.

Using an ultrasonic sensor from the related art, post 6 may generally be easily recognized. Bushes 4, however, could not be detected therewith. The bushes simultaneously cause a multitude of sound reflections, which are unable to be differentiated from surroundings noises with such an ultrasonic sensor if the distance between vehicle 2 and bushes 4 is still relatively great.

In contrast thereto, it is possible using the object recognition device or the method according to the present invention to quickly recognize both post 6 as well as bushes 4.

Figure 2:
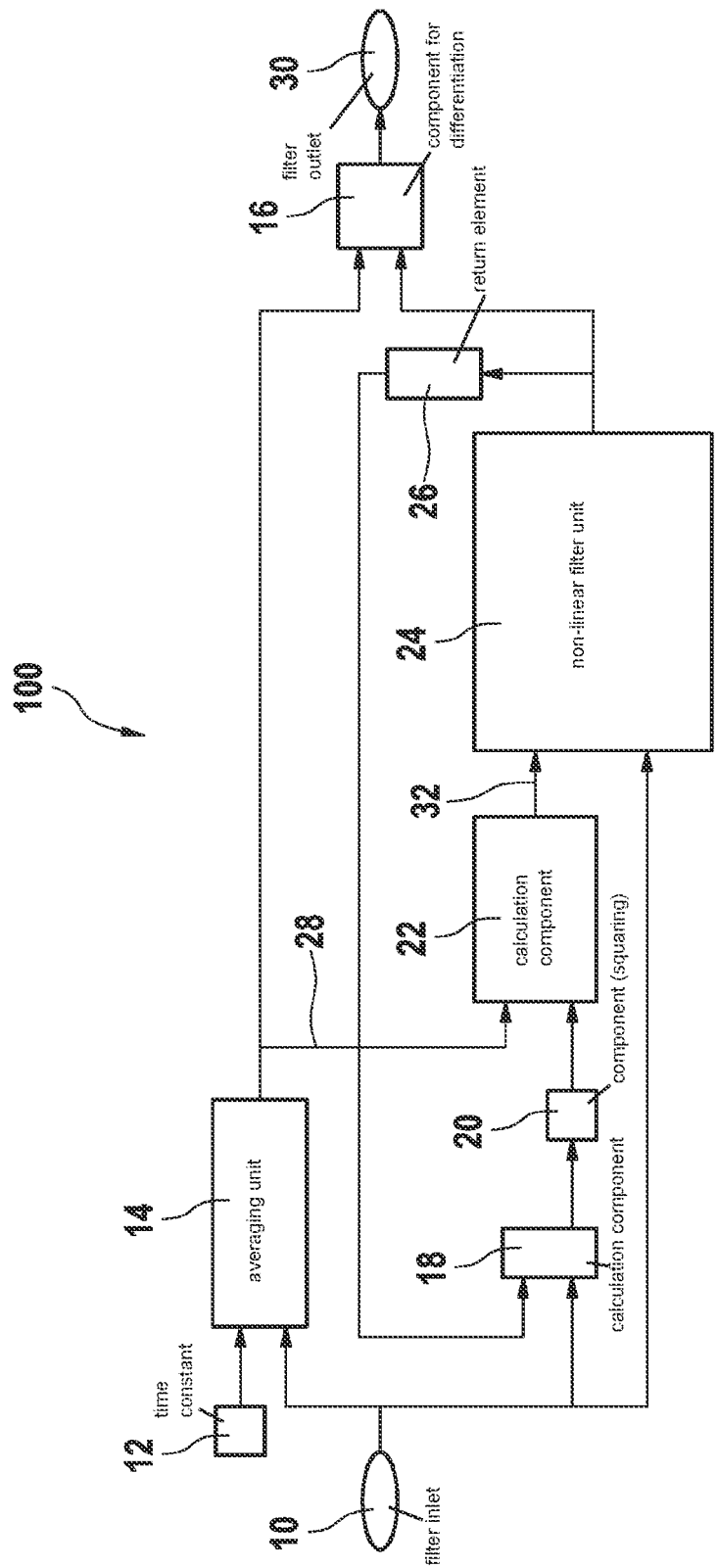
FIG. 2 shows a filter device schematically depicted with a block diagram of one specific embodiment of the object recognition device according to the present invention.

FIG. 2 shows a filter device of one specific embodiment of the object recognition device according to the present invention schematically depicted with a block diagram.

Filter device 100 schematically depicted with a block diagram in FIG. 2 includes a filter inlet 10 and a filter outlet 30. The signals from at least one ultrasonic detection sequence detected by the sensor of the object recognition device according to the present invention are fed to filter inlet 10. The signals filtered by filter device 100 are fed to the analysis device.

Filter device 100 also includes an averaging unit 14, which averages the profile of the amplitudes of the detected signals. According to the specific embodiment depicted in FIG. 2, averaging unit 14 is a low-pass filter, which includes an invariable time constant 12.

Filter device 100 also includes a non-linear filter unit 24, which is provided with a variable time constant 32 based on a linear low-pass filter and filters the detected signals.

The signals filtered by non-linear filter unit 24 are fed to component 16 for differentiation with the averaged amplitude profile of the detected signals. These filtered signals are also returned via a return element 26 with a time delay to deviation calculation component 18, in which the deviation of these filtered signals and of the detected signals is calculated.

The result from deviation calculation component 18 is squared in component 20 and fed to calculation component 22, which calculates the variable time constant according to the present invention.

To calculate or establish the variable time constant, the averaged amplitude profile of the detected signals is also fed by a transmission element 28 to calculation component 22.

Figure 3:
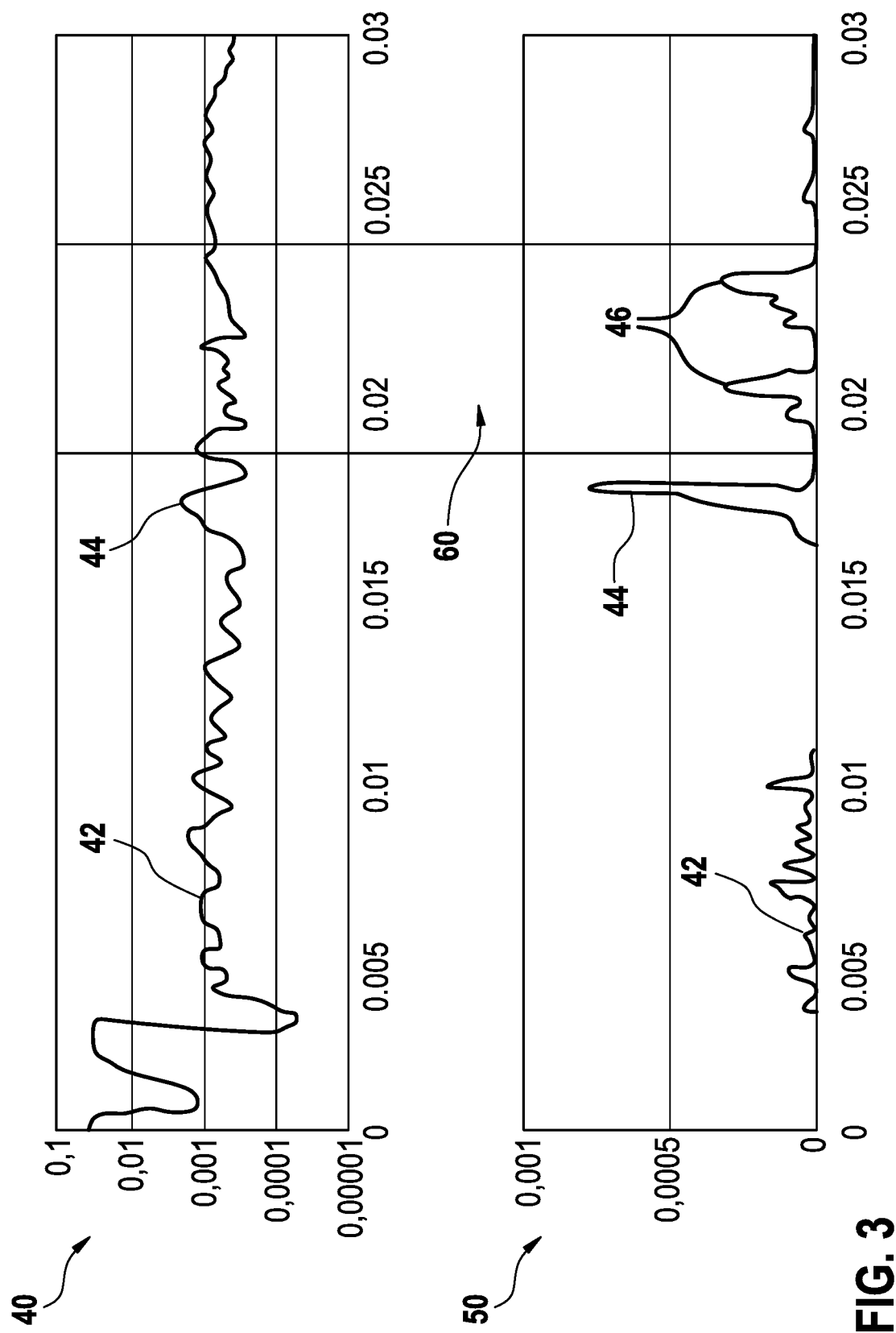
FIG. 3 schematically shows a representation of two diagrams, the averaged amplitude profile of the signals detected by the sensor being depicted in the upper diagram, and the amplitude profile of the output signal of the filter device of the specific embodiment of the object recognition device according to the present invention according to FIG. 2 being depicted in the lower diagram.

FIG. 3 is a schematic representation of two diagrams 40, 50. The averaged amplitude profile of the signals detected by the sensor, which results, for example, from the adaptive threshold of the related art, is depicted in upper diagram 40. The amplitude profile of the output signal of the filter device of the specific embodiment of the object recognition device according to the present invention according to FIG. 2 is depicted in the lower diagram.

The x-axes in the two diagrams are the time in seconds and the corresponding y-axes are the amplitude in dBA. In the upper diagram, the zero point of the y-axis is vertically offset.

As is shown in FIG. 3, echoes 42, which are caused due to the uneven ground condition in parking facility 8, appear between approximately 5 ms and 10 ms in the two diagrams. A strong spike 44 occurs at approximately 18 ms as a result of reflecting post 6.

Approximately 2.5 ms later, this strong echo 44 is followed by a further echo 46, which may be traced back to bushes 4 (see time window 60). This is not apparent in upper diagram 40 in accordance with the related art, but is apparent in lower diagram 50 in accordance with the object recognition device according to the present invention.

Although the present invention has been fully described above with reference to preferred exemplary embodiments, it is not limited thereto, but is modifiable in a variety of ways. The variable time constant indicated is, in particular, explained merely as an example and not as restricting.

What is claimed is:

1. An object recognition device for a vehicle, comprising:
   at least one ultrasonic sensor;
   an averaging unit;
   a filter device; and
   an analysis device,
   wherein signals from an object to be recognized are detectable by the sensor, the detected signals being filterable by the filter device, and then being feedable to the analysis device, and the analysis device being configured to recognize the object by an analysis of the fed filtered signals;
   wherein:
      the averaging unit averages a profile of amplitudes of the detected signals,
      the filter device includes a non-linear filter unit, which is provided based on a linear low-pass filter with a variable time constant and is configured to filter the detected signals,
      a value profile corresponding to a difference between the averaged amplitude profile and the filtered signals being feedable to the analysis device for analyzing and recognizing the object, and
      the variable time constant being establishable based on a difference between the filtered signals and the detected signals and based on the averaged amplitude profile.

2. The object recognition device as recited in claim 1, wherein the sensor and the filter device are situated together in a shared housing.

3. The object recognition device as recited in claim 1, wherein the variable time constant is establishable with a squared deviation between the filtered signals and the detected signals, with a predefined minimum time constant, a predefined maximum time constant, a predefined tolerance width and a grade, which determines a transition between the predefined minimum time constant and the predefined maximum time constant.

4. The object recognition device as recited in claim 3, wherein the grade corresponds proportionally to an inverse of a square of an amplitude value provided in the averaged amplitude profile.

5. The object recognition device as recited in claim 3, wherein the variable time constant is establishable as the predefined maximum time constant when the squared deviation between the filtered signals and the detected signals is within a predefined tolerance width.

6. The object recognition device as recited in claim 1, wherein the averaging unit is a low-pass filter, or a unit configured to implement a method of the floating average, or a unit configured to implement a method of an adaptive threshold.

7. The object recognition device as recited in claim 1, wherein the filter unit includes a calculation component, which is configured to calculate the variable time constant, the filter unit includes a return element, which is configured to return the filtered signals with a time delay to the calculation component for establishing the variable time constant, and the filter unit includes a transmission element, which is configured to transmit the averaged amplitude profile to the calculation component for establishing the variable time constant.

8. The object recognition device as recited in claim 1, wherein the signals from the object, which is 0.1 m to 20 m away from the sensor, are detectable by the sensor.

9. The object recognition device as recited in claim 1, wherein the signals from the object, which is 1 m to 6 m away from the sensor, are detectable by the sensor.

10. The object recognition device as recited in claim 1, further comprising a further sensor, wherein optical signals are detectable by the further sensor for determining a type and condition of the object.

11. A method for recognizing an object for a vehicle, comprising the following steps:
   detecting signals from an object to be recognized using an ultrasonic sensor;
   filtering the detected signals using a filter device;
   feeding the filtered signals to an analysis device;
   analyzing the fed filtered signals using the analysis device; and
   recognizing the object using the analysis device,
   wherein:
      the filter device includes an averaging unit, which averages a profile of amplitudes of the detected signals, the filter device includes a non-linear filter unit, which is provided based on a linear low-pass filter with a variable time constant and filters the detected signals, a value profile corresponding to a difference between the averaged amplitude profile and the filtered signals is fed to the analysis device for analyzing and recognizing the object, and the variable time constant is established based on a difference between the filtered signals and the detected signals and based on the averaged amplitude profile.

12. The method as recited in claim 11, wherein the value profile corresponding to the difference between the averaged amplitude profile and the filtered signals is processed in such a way that negative difference values are disregarded.

* * * * *